US012640081B2

(12) United States Patent
Ahn

(10) Patent No.: US 12,640,081 B2
(45) Date of Patent: May 26, 2026

(54) DISPLAY DEVICE, ELECTRONIC APPARATUS, AND METHOD OF ESTIMATING TEMPERATURE OF DISPLAY DEVICE

(71) Applicant: SAMSUNG DISPLAY CO., LTD., Yongin-si (KR)

(72) Inventor: Kuk-Hwan Ahn, Yongin-si (KR)

(73) Assignee: SAMSUNG DISPLAY CO., LTD., Yongin-si (KR)

(*) Notice: Subject to any disclaimer, the term of this patent is extended or adjusted under 35 U.S.C. 154(b) by 0 days.

(21) Appl. No.: 19/067,205

(22) Filed: Feb. 28, 2025

(65) Prior Publication Data

US 2026/0004692 A1 Jan. 1, 2026

(30) Foreign Application Priority Data

Jun. 28, 2024 (KR) ........................ 10-2024-0084948

(51) Int. Cl.
*G09G 3/20* (2006.01)

(52) U.S. Cl.
CPC ... *G09G 3/2092* (2013.01); *G09G 2310/0275* (2013.01); *G09G 2320/041* (2013.01)

(58) Field of Classification Search
CPC ............... G09G 3/2092; G09G 3/2096; G09G 2310/0275; G09G 2320/041
See application file for complete search history.

(56) References Cited

U.S. PATENT DOCUMENTS 6,995,519 B2 * 2/2006 Arnold ................. G09G 3/3225 345/82
7,183,727 B2 * 2/2007 Ferguson ............. H05B 41/386 315/308
7,391,172 B2 * 6/2008 Ferguson ........... H05B 41/3922 315/308
7,420,538 B2 * 9/2008 Murao ................. G09G 3/3648 349/56
9,268,579 B2 * 2/2016 Tann ........................ G09G 5/10
12,073,778 B2 8/2024 Ahn et al.
12,225,645 B2 * 2/2025 Kim .................. G02F 1/133601
12,266,286 B2 * 4/2025 Ahn ...................... G09G 3/2007
2005/0110420 A1 * 5/2005 Arnold ................. G09G 3/3225 315/169.3

(Continued)

FOREIGN PATENT DOCUMENTS

CN 118057513 A 5/2024
KR 10-2024-0074095 A 5/2024

*Primary Examiner* — Gene W Lee
(74) *Attorney, Agent, or Firm* — F. CHAU & ASSOCIATES, LLC

(57) ABSTRACT

A display device includes a display panel including a plurality of blocks, a data driver which provides data voltages to the display panel, and a controller which controls the data driver according to a temperature profile, stores a turn-off temperature profile of the display device, estimates a turn-on temperature profile at a turn-on time of the display device based on the turn-off temperature profile, a temperature change rate after a turn-off of the display device, and an elapsed time from a turn-off time of the display device to the turn-on time, and calculates the temperature profile based on the turn-on temperature profile and a temperature increase profile after a turn-on of the display device.

20 Claims, 12 Drawing Sheets

(56) References Cited

U.S. PATENT DOCUMENTS

| | | | | |
|---|---|---|---|---|
| 2014/0359257 | A1 * | 12/2014 | Tann | G06F 9/4418 713/1 |
| 2023/0389160 | A1 * | 11/2023 | Kim | H05B 45/56 |
| 2024/0377967 | A1 | 11/2024 | Ahn et al. | |

* cited by examiner

DISPLAY DEVICE, ELECTRONIC APPARATUS, AND METHOD OF ESTIMATING TEMPERATURE OF DISPLAY DEVICE

CROSS-REFERENCE TO RELATED APPLICATION(S)

This application claims priority under 35 USC § 119 to Korean Patent Application No. 10-2024-0084948, filed on Jun. 28, 2024, in the Korean Intellectual Property Office (KIPO), the entire disclosure of which is incorporated by reference herein.

BACKGROUND

1. Technical Field

Embodiments relate to a method of estimating a temperature of a display device. More particularly, embodiments relate to a method of generating a temperature profile of the display device, a display device which performs the method, and an electronic apparatus including the display device.

2. Discussion of Related Art

A display device may include a display panel that displays an image and a data driver that provides data voltages to the display panel. The display panel (or the display device) may increase in temperature over time due to heat generation of the display device, which may affect a characteristic of the image.

SUMMARY

Embodiments provide a display device which accurately calculates a temperature profile.

Embodiments provide an electronic apparatus which accurately calculates a temperature profile of a display device.

Embodiments provide a method of calculating a temperature profile of the display device.

A display device according to embodiments includes a display panel including a plurality of blocks, a data driver configured to provide data voltages to the display panel, and a controller configured to control the data driver according to a temperature profile, store a turn-off temperature profile of the display device, estimate a turn-on temperature profile at a turn-on time of the display device using the turn-off temperature profile, a temperature change rate after a turn-off of the display device, and an elapsed time from a turn-off time of the display device to the turn-on time, and calculate a temperature profile based on the turn-on temperature profile and a temperature increase profile after a turn-on of the display device.

In an embodiment, each of the turn-off temperature profile and the turn-on temperature profile may include temperature values corresponding to the plurality of blocks.

In an embodiment, the controller may be configured to periodically store the temperature profile after the turn-on of the display device.

In an embodiment, the controller may be configured to store the turn-off temperature profile at the turn-off time of the display device.

In an embodiment, the display device may include a non-volatile memory, wherein the turn-off temperature profile may be stored in a non-volatile memory.

In an embodiment, the temperature change rate may be a ratio of a difference between a temperature of the display device and an external temperature after the turn-off of the display device to a difference between the temperature of the display device and the external temperature at the turn-off time.

In an embodiment, the display device may further include a timer which configured to measure the elapsed time and provide the elapsed time to the controller.

In an embodiment, the controller may be configured to estimate the turn-on temperature profile using a look-up table in which the temperature change rate is stored.

In an embodiment, the controller may be configured to estimate the turn-on temperature profile using an equation which represents the temperature change rate.

In an embodiment, the controller may include a plurality of look-up table which store the temperature change rate for a plurality of external temperature ranges, and the controller may be configured to estimate the turn-on temperature profile using a look-up table for an external temperature range which includes an external temperature at the turn-off of the display device among the plurality of look-up tables.

In an embodiment, the temperature increase profile may be calculated based on the data voltages.

An electronic apparatus according to embodiments includes a display device which may be configured to display an image, and may include a display panel including a plurality of blocks, a data driver configured to provide data voltages to the display panel, and a controller configured to control the data driver according to a temperature profile, store a turn-off temperature profile of the display device, estimate a turn-on temperature profile at a turn-on time of the display device using the turn-off temperature profile, a temperature change rate after a turn-off of the display device, and an elapsed time from a turn-off time of the display device to the turn-on time, and calculate the temperature profile based on the turn-on temperature profile and a temperature increase profile after a turn-on of the display device, and a processor which may be configured to provide image data to the display device, wherein the display device converts the image data into the data voltages.

In an embodiment, each of the turn-off temperature profile and the turn-on temperature profile may include temperature values corresponding to the plurality of blocks of the display device.

In an embodiment, the controller may be configured to periodically may store the temperature profile after the turn-on of the display device.

In an embodiment, the display device may further include a-volatile memory, wherein the turn-off temperature profile may be stored in the non-volatile memory.

In an embodiment, the temperature change rate may be a ratio of a difference between a temperature of the display device and an external temperature after the turn-off of the display device to a difference between the temperature of the display device and the external temperature at the turn-off time.

In an embodiment, the controller may be configured to estimate the turn-on temperature profile using a look-up table in which the temperature change rate is stored.

In an embodiment, the controller may be configured to calculate the temperature increase profile may be calculated based on grayscales of the image data.

A method of estimating a temperature of a display device according to embodiments includes storing a turn-off temperature profile of the display device, estimating a turn-on temperature profile at a turn-on time of the display device using the turn-off temperature profile, a temperature change rate after a turn-off of the display device, and an elapsed time from a turn-off time of the display device to the turn-on time, and calculating a temperature profile based on the turn-on temperature profile and a temperature increase profile after a turn-on of the display device.

In an embodiment, the temperature change rate may be a ratio of a difference between a temperature of the display device and an external temperature after the turn-off of the display device to a difference between the temperature of the display device and the external temperature at the turn-off time.

In the display device, the electronic apparatus, and the method of estimating the temperature of the display device according to embodiments, the turn-on temperature profile at the turn-on time may be estimated based on the turn-off temperature profile before the turn-off of the display device, the temperature change rate after the turn-off of the display device, and the elapsed time from the turn-off time to the turn-on time, so that the temperature profile of the display device may be accurately calculated. The temperature profile of the display device may be used to adjust settings of the display device, such as a driving voltage or a backlight intensity. These setting may be adjusted dynamically. For example, the settings of the display device may be used to maintain consistent performance.

BRIEF DESCRIPTION OF THE DRAWINGS

Illustrative, non-limiting embodiments will be more clearly understood from the following detailed description taken in conjunction with the accompanying drawings.

DETAILED DESCRIPTION

Figure 1:
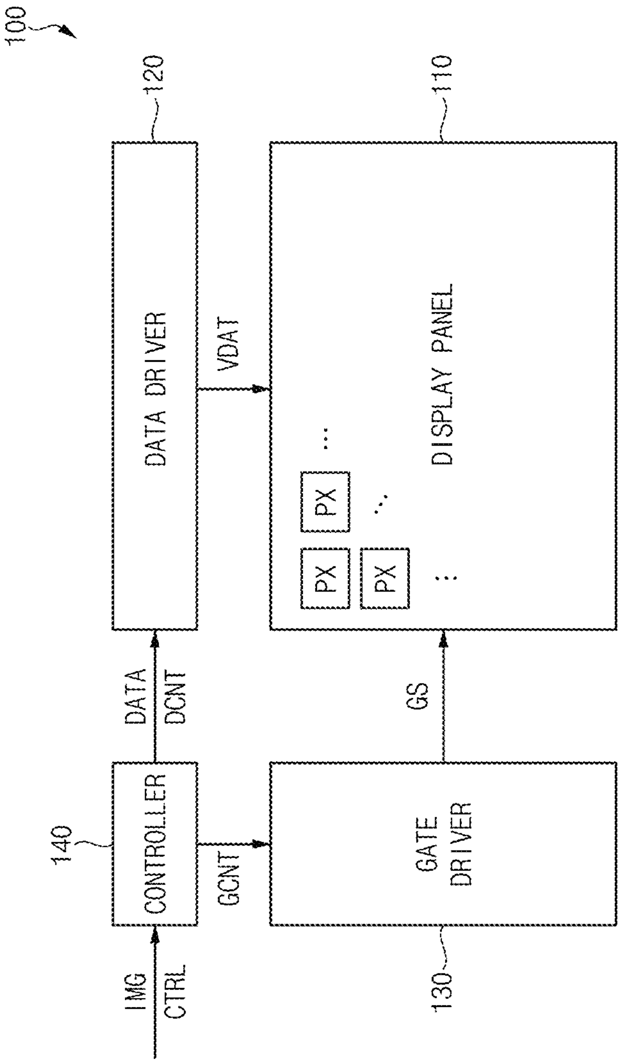
FIG. 1 is a block diagram showing a display device according to an embodiment.

Hereinafter, a display device, an electronic apparatus, and a method of estimating a temperature of a display device according to embodiments of the present disclosure will be described in more detail with reference to the accompanying drawings. Inventive concepts may be implemented in various modifications and have various forms. It is to be understood, however, that the inventive concepts are not intended to be limited to the particular forms disclosed, but on the contrary, is intended to cover all modifications, equivalents, and alternatives falling within the spirit and scope of the inventive concepts. The same or similar reference numerals will be used for the same elements in the accompanying drawings.

According to an aspect of the present disclosure, a temperature profile of the display panel may be determined based on a turn-on temperature profile at a turn-on time of the display device and a temperature increase profile after a turn-on of the display device. When the display device is turned on after being turned off for a long time, a temperature of the display device at the turn-on time of the display device may be substantially equal to an external temperature. When the display device is turned on before being completely cooled after being turned off, the temperature of the display device at the turn-on time of the display device may be different than the external temperature. Accordingly, an accurate estimation of the turn-on temperature profile at the turn-on time of the display device may be used to generate an accurate temperature profile.

According to an aspect of the present disclosure, in a display device, a turn-on temperature profile at a turn-on time of the display device may be estimated using a turn-off temperature profile of the display device, a temperature change rate after a turn-off of the display device, and an elapsed time from a turn-off time of the display device to the turn-on time, and a temperature profile of the display device may be calculated using the turn-on temperature profile and a temperature increase profile after the turn-on of the display device, so that the temperature profile of the display device may be calculated.

Figure 2:
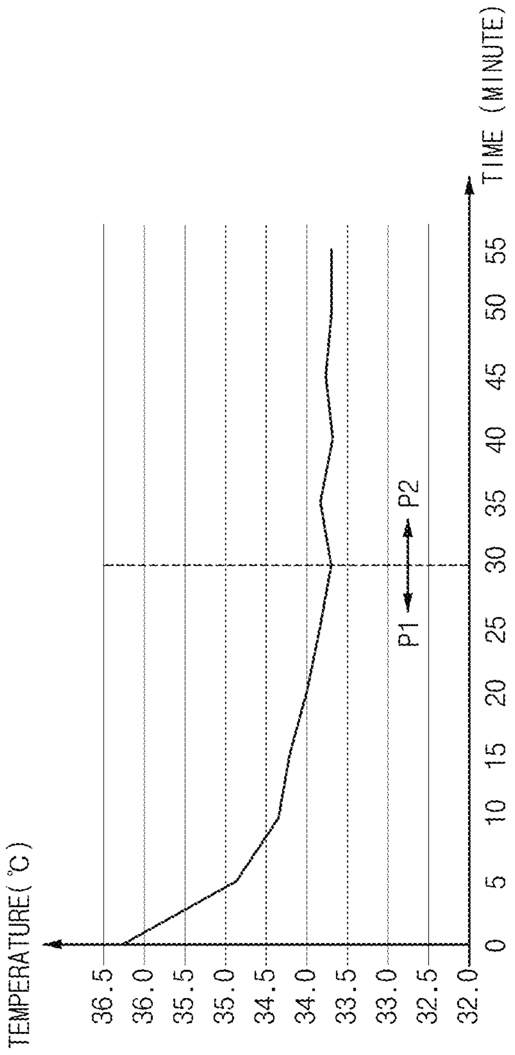
FIG. 2 is a graph showing a temperature change after a turn-off of the display device of FIG. 1.
Figure 3:
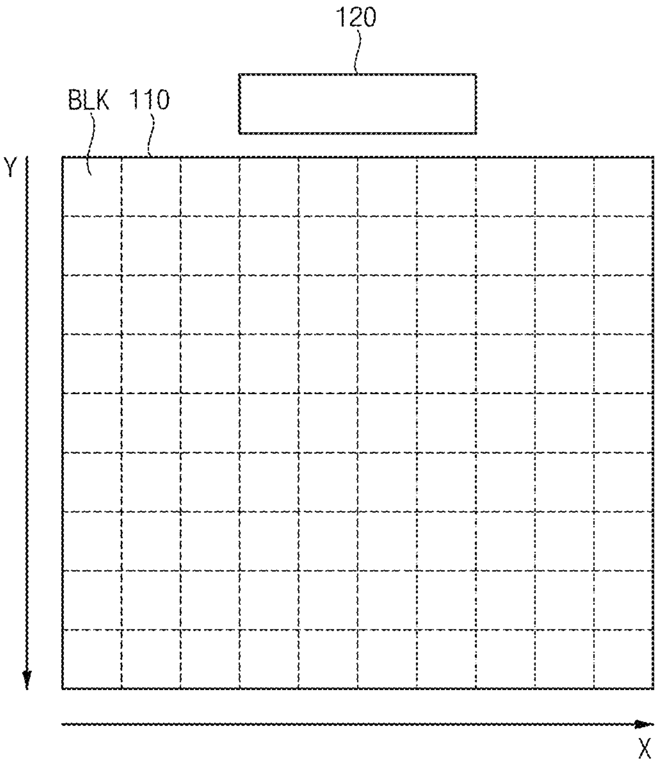
FIG. 3 is a plan view showing a display panel of FIG. 1.
Figure 4:
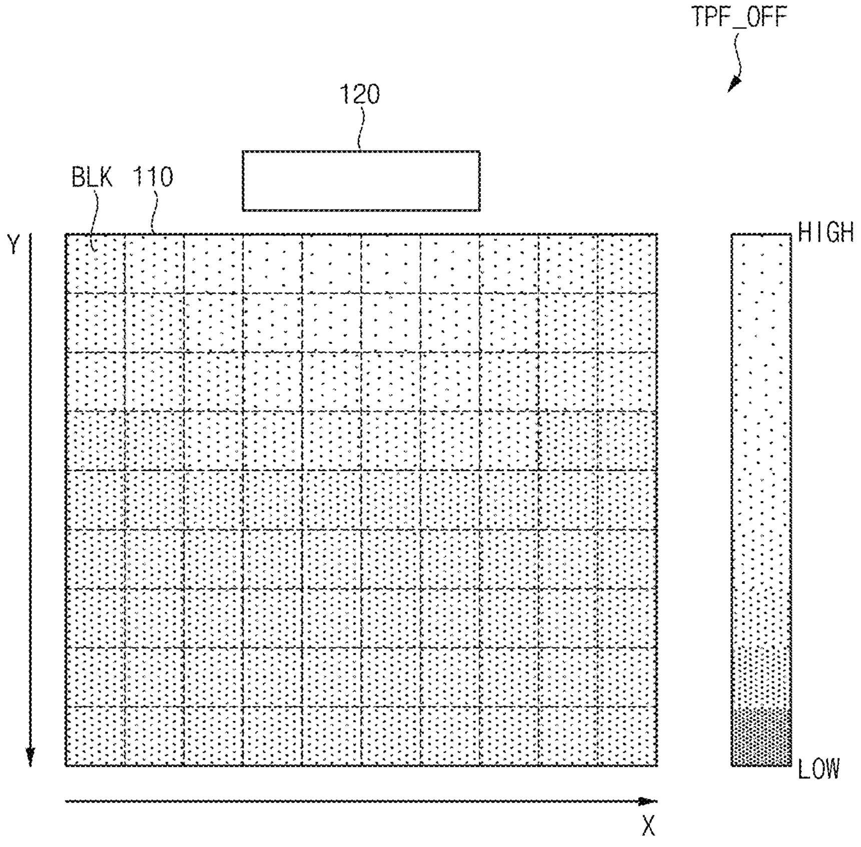
FIG. 4 is a view showing an example of a turn-off temperature profile of the display panel of FIG. 3.
Figure 5:
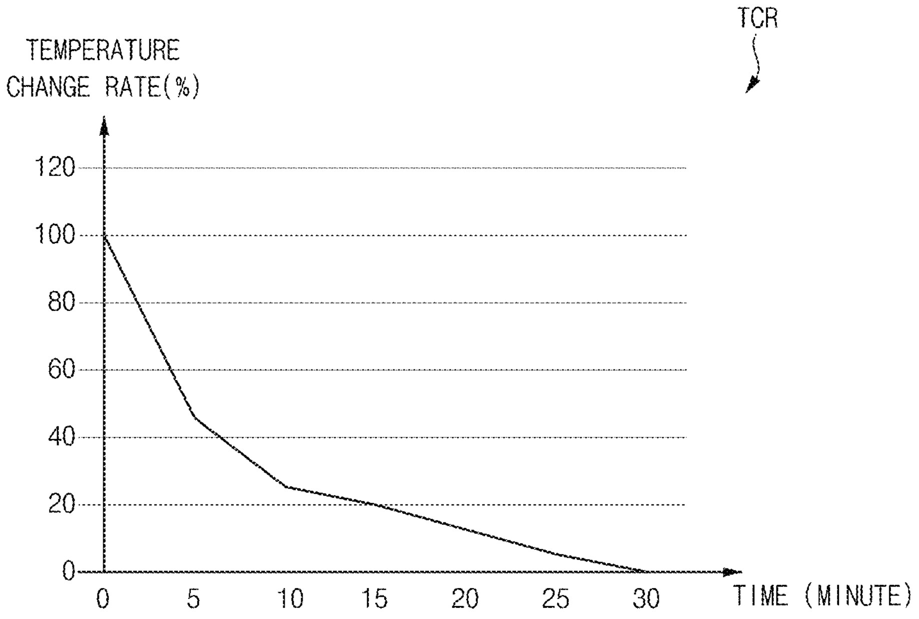
FIG. 5 is a graph showing an example of a temperature change rate after the turn-off of the display device.
Figure 6:
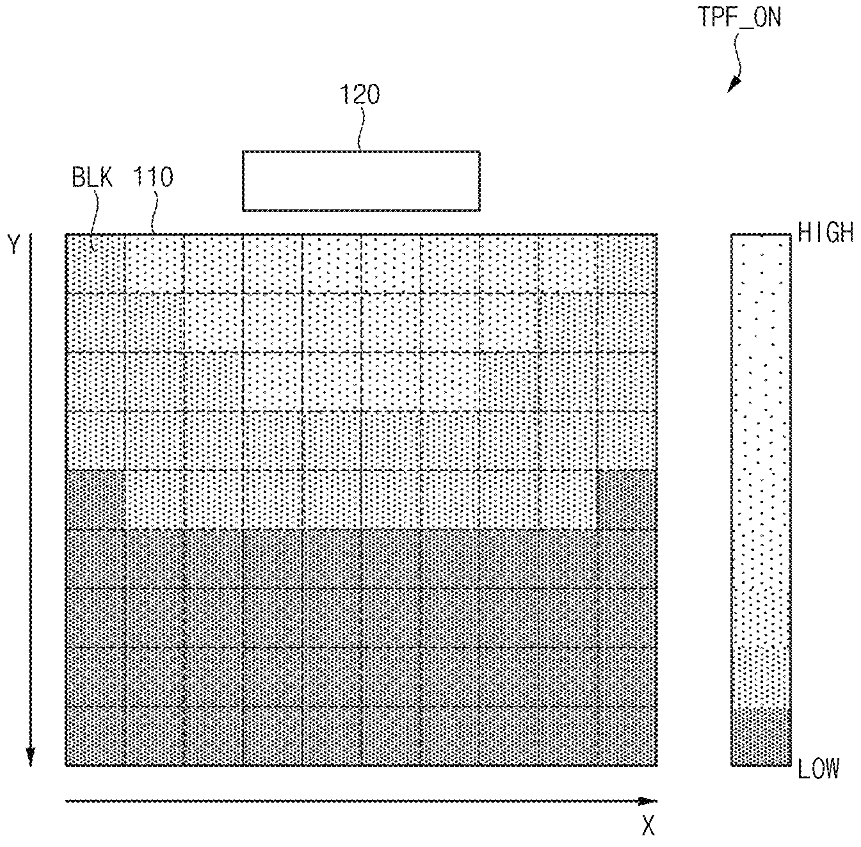
FIG. 6 is a view showing an example of the turn-off temperature profile of the display panel of FIG. 3.
Figure 7:
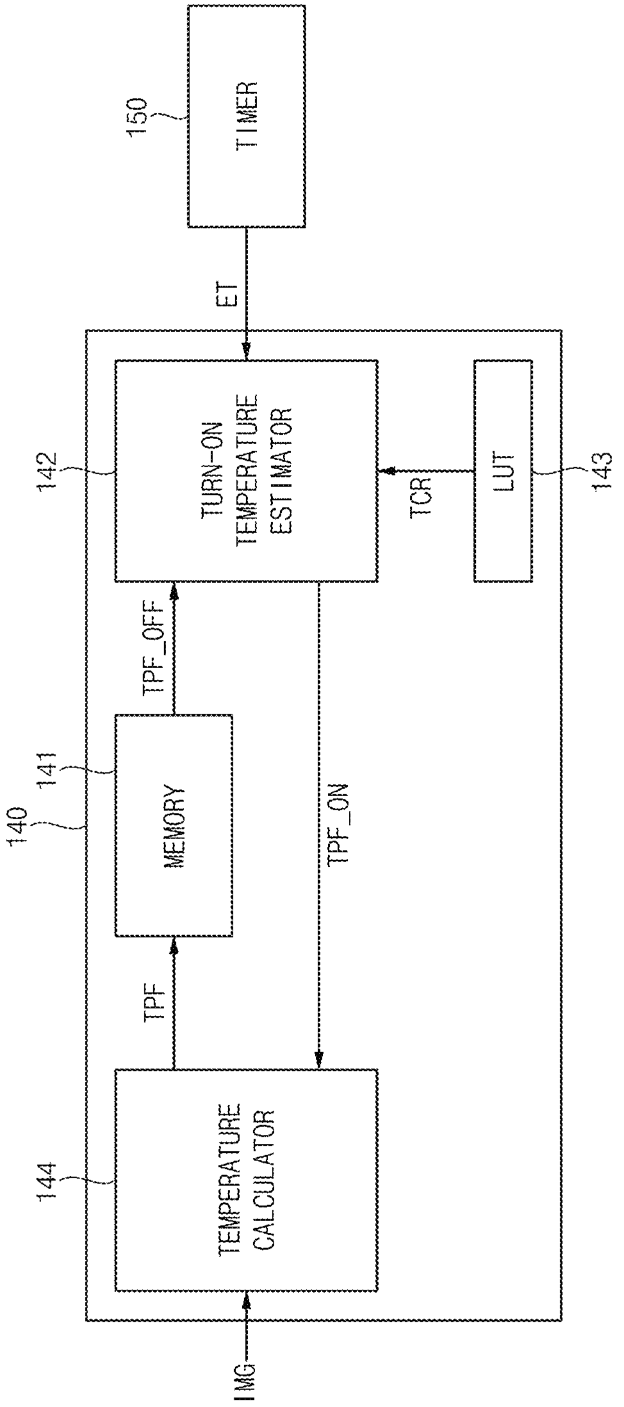
FIG. 7 is a block diagram showing an example of a controller of FIG. 1.

FIG. 1 is a block diagram showing a display device 100 according to an embodiment. FIG. 2 is a graph showing a temperature change after a turn-off of the display device 100 of FIG. 1. FIG. 3 is a plan view showing a display panel 110 of FIG. 1. FIG. 4 is a view showing an example of a turn-off temperature profile TPF_OFF of the display panel 110 of FIG. 3. FIG. 5 is a graph showing an example of a temperature change rate TCR after the turn-off of the display device 100. FIG. 6 is a view showing an example of the turn-off temperature profile TPF_ON of the display panel 110 of FIG. 3. FIG. 7 is a block diagram showing an example of a controller 140 of FIG. 1.

Referring to FIGS. 1 to 7, the display device 100 may include a display panel 110, a data driver 120, a gate driver 130, and a controller 140.

The display panel 110 may include a plurality of pixels PX. The pixels PX may emit light in response to data voltages VDAT and gate signals GS.

The data driver 120 may provide the data voltages VDAT to the display panel 110. The data driver 120 may generate the data voltages VDAT based on a data signal DATA and a data control signal DCNT. The data driver 120 may convert the data signal DATA in a digital format into the data voltages VDAT in an analog format. The data control signal DCNT may include at least one of a data clock signal or a load signal. The data control signal DCNT may include additional signals.

The gate driver 130 may provide the gate signals GS to the display panel 110. The gate driver 130 may generate the gate signals GS based on a gate control signal GCNT. The gate control signal GCNT may include at least one of a gate clock signal or a gate start signal. The gate control signal GCNT may include additional signals.

The controller 140 may control the data driver 120 and the gate driver 130. The controller 140 may provide the data signal DATA and the data control signal DCNT to the data driver 120. The controller 140 may provide the gate control signal GCNT to the gate driver 130. The controller 140 may generate the data signal DATA, the data control signal DCNT, and the gate control signal GCNT based on image data IMG and a control signal CTRL. The image data IMG and the control signal CTRL may be received from an exterior of the display device 100. The image data IMG may include data corresponding to the pixels PX. For example, the image data IMG may include grayscales corresponding to the pixels PX.

The controller 140 may calculate a temperature profile of the display panel 110. The temperature profile may include temperature values corresponding to a plurality of areas of the display panel 110. For example, the temperature profile may be a two-dimensional temperature profile including temperature values corresponding to a plurality of areas of the display panel 110. The plurality of areas may be the plurality of pixels PX or a plurality of blocks BLK each including a plurality of pixels PX.

The controller 140 may calculate the temperature profile based on a temperature increase profile of the display panel 110 and a turn-on temperature profile at a turn-on time of the display device 100. A temperature of the display panel 110 may increase due to heat generation of the data driver 120 after a turn-on of the display device 100, and the temperature increase profile may be determined based on the data voltages VDAT. For example, the controller 140 may calculate the temperature increase profile based on the data voltages VDAT. Specifically, the controller 140 may calculate the temperature increase profile based on a swing level of the data voltages VDAT. The swing level of the data voltages VDAT may be referred to as a load of the data driver 120. The swing level of the data voltages VDAT may include a range of voltages used to drive the pixels PX, which may affect the luminance levels of the pixels PX. For example, the temperature increase profile may be large when the swing level of the data voltages VDAT is large, and the temperature increase profile may be small when the swing level of the data voltages VDAT is small. The controller 140 may use the temperature profile of the display device 100 to adjust settings of the display device 100, such as a driving voltage or a backlight intensity. These setting may be adjusted dynamically. For example, the settings of the display device 100 may be used to maintain consistent performance. Here, performance may refer to an image quality across a range of the temperature profile. In another example, the temperature profile of the display device 100 may be used to improve an energy-efficiency of display device 100 with a control (e.g., minimum acceptable standards) on image quality and/or heat generation.

As illustrated in FIG. 2, after the display device 100 is turned off, the temperature of the display device 100 may decrease in a first period P1, and the temperature of the display device 100 may be maintained in a second period P2. The first period P1 may be a period in which a cooling of the display device 100 is in progress, and the second period P2 may be a period in which the cooling of the display device 100 is completed. For example, the second period P2 may be a period in which a temperature of the display device 100 is stably maintained at or near a temperature of the environment (for example, within about 2 degrees, or within about 1 degree, or within about ½ a degree) that may be a temperature below a temperature of the first period P1. The turn-on temperature profile when the display device 100 is turned on within the first period P1 and the turn-on temperature profile when the display device 100 is turned on within the second period P2 may be different temperatures. Further, even if the display device 100 is turned on within the first period P1, the turn-on temperature profiles may be different depending on times at which the display device 100 is turned on within the first period P1.

To accurately calculate the temperature profile, the controller 140 may store a turn-off temperature profile TPF_OFF before a turn-off of the display device 100, and may estimate a turn-on temperature profile TPF_ON at a turn-on time based on the turn-off temperature profile TPF_OFF, a temperature change rate TCR after the turn-off of the display device 100, and an elapsed time ET from a turn-off time of the display device 100 to the turn-on time. The controller 140 may calculate the temperature profile TPF based on the turn-on temperature profile TPF_ON and the temperature increase profile after the turn-on of the display device 100. As the controller 140 may estimate the turn-on temperature profile TPF_ON at the turn-on time based on the turn-off temperature profile TPF_OFF, the temperature change rate TCR, and the elapsed time ET, the temperature profile TPF of the display device 100 may be accurately calculated.

As illustrated in FIG. 3, the display panel 110 may include a plurality of blocks BLK arranged on a XY plane defined by an X-axis and a Y-axis. In an embodiment, each of the blocks BLK may include a plurality of pixels PX.

As illustrated in FIG. 4, the turn-off temperature profile TPF_OFF may include one or more temperature values corresponding to the blocks BLK. In FIG. 4, a temperature of the block BLK may be higher as a color of the block BLK is brighter, and the temperature of the block BLK may be lower as the color of the block BLK is darker. For example, the pixels of each block BLK may emit their own light, and the generation of brighter colors may consume more power and generate more heat compared to darker colors. A block BLK whose pixels PX are brighter, on average, than another block, may generate more heat. According to an aspect of the present disclosure, the turn-off temperature profile TPF_OFF may be determined using, for example, an average value of the pixels within a block BLK, a maximum value of a pixel within a block BLK, a minimum value of a pixel within a block BLK, or a median value of the pixels within a block BLK. Other methods of determining the turn-off temperature profile TPF_OFF may be used.

In an embodiment, the controller 140 may periodically store the temperature profile TPF after the turn-on of the display device 100. In this case, the controller 140 may use the temperature profile TPF last stored before the turn-off of the display device 100 as the turn-off temperature profile TPF_OFF.

In an embodiment, the controller 140 may store the turn-off temperature profile TPF_OFF at the turn-off time of the display device 100. In this case, the controller 140 may calculate and store the turn-off temperature profile TPF_OFF after the turn-off of the display device 100. For example, the controller 140 may calculate and store the turn-off temperature profile TPF_OFF immediately after the turn-off of the display device 100. Here, immediately after may be within about 5 seconds of the turn-off of the display device 100, or within about 1 second, or within about 0.25 seconds. According to an aspect of the present disclosure, the turn-off temperature profile TPF_OFF may be stored during, or before, the turn-off of the display device 100, for example, after a command is received by the controller 140 to turn-off of the display device 100 but before the command is executed, or the turn-off temperature profile TPF_OFF may be periodically stored while the display device 100 is turned-on, wherein a last store of the turn-off temperature profile TPF_OFF before the turn-off of the display device 100 may be used.

The turn-off temperature profile TPF_OFF may be stored in a non-volatile memory. For example, the turn-off temperature profile TPF_OFF may be stored in a flash memory. Accordingly, the turn-off temperature profile TPF_OFF may be stored by the controller 140 after the turn-off of the display device 100, and the turn-on temperature profile TPF_ON may be estimated based on the turn-off temperature profile TPF_OFF after the turn-on of the display device 100.

As illustrated in FIG. 5, the temperature change rate TCR may be a ratio of a difference between a temperature of the display device 100 and an external temperature at a time after the turn-off of the display device 100 to a difference between the temperature of the display device 100 and the external temperature at the turn-off time (Time=0) of the display device 100. For example, the ratio may be expressed as:

$$\text{ratio} = \frac{\textit{temp.}\text{ of display(current)} - \text{external } \textit{temp.}\text{(current)}}{\textit{temp.}\text{ of display(at turn-off)} - \text{external } \textit{temp.}\text{(at turn-off)}}$$

In the case that the temperature of the display device 100 decreases from the turn-off time (Time=0) of the display device 100, the temperature change rate TCR may decrease over time from the turn-off time of the display device 100. According to an aspect of the present disclosure, the determination of the difference between a temperature current of the display device 100 and the external temperature after the turn-off of the display device 100 may use the external temperature at the turn-off time, and for example, a re-determination of the external temperature may be omitted. According to an aspect of the present disclosure, the determination of the external temperatures may be omitted, and for example, the ratio may be a ratio of the temperature of the display device 100 at a time after the turn-off of the display device 100 to the temperature of the display device 100 at the turn-off time (Time=0) of the display device 100.

As illustrated in FIG. 6, the turn-on temperature profile TPF_ON may include temperature values corresponding to the blocks BLK. In FIG. 6, the temperature of the block BLK may be higher as the color of the block BLK is brighter, and the temperature of the block BLK may be lower as the color of the block BLK is darker. As illustrated in FIG. 4 and FIG. 6, in the same block BLK, the temperature of the block BLK at the turn-on time may be lower than the temperature of the block BLK before the turn-off of the display device 100.

The controller 140 may calculate the turn-on temperature profile TPF_ON using Equation 1.

$$\text{T\_ON}(x, y) = \frac{TCR(ET)}{100} \times \text{T\_OFF}(x, y) \quad \text{[Equation 1]}$$

In Equation 1, T_ON(x,y) may be a temperature value corresponding to a block BLK included in the turn-on temperature profile TPF_ON and located at a (x,y) coordinate, TCR (ET) may be the temperature change rate TCR at the elapsed time ET, and T_OFF(x,y) may be a temperature value corresponding to a block BLK included in the turn-off temperature profile TPF_OFF and located at the (x,y) coordinate.

In an embodiment, the controller 140 may estimate the turn-on temperature profile TPF_ON using a lookup table LUT in which the temperature change rate TCR is stored. The lookup table LUT may be generated by measuring the temperature of the display device 100 after the turn-off of the display device 100.

As illustrated in FIG. 7, in an embodiment, the controller 140 may include a memory 141, a turn-on temperature estimator 142, a lookup table LUT 143, and a temperature calculator 144. The memory 141 may store the temperature profile TPF including the turn-off temperature profile TPF_OFF. The memory 141 may be a non-volatile memory. For example, the memory 141 may be a flash memory. The turn-on temperature estimator 142 may estimate the turn-on temperature profile TPF_ON based on the turn-off temperature profile TPF_OFF, the temperature change rate TCR, and the elapsed time ET. The lookup table LUT 143 may store the temperature change rate TCR. The temperature calculator 144 may calculate the temperature profile TPF based on the turn-on temperature profile TPF_ON and the temperature increase profile after the turn-on of the display device 100.

In an embodiment, the display device 100 may further include a timer 150 that measures the elapsed time ET and provides the elapsed time ET to the controller 140. For example, the timer 150 may measure the elapsed time ET by counting a clock signal from the turn-off time to the turn-on time of the display device 100. According to an aspect of the present disclosure, the timer 150 may be a Real-Time Clock (RTC) chip powered by a battery or may use a Network Time Protocol (NTP). These are examples, and the present disclosure is not limited therefore, for example, the timer 150 may be a Global Positioning Sensor (GPS) module may be used to determine the time at turn-off and the time at turn-on.

Figure 8:
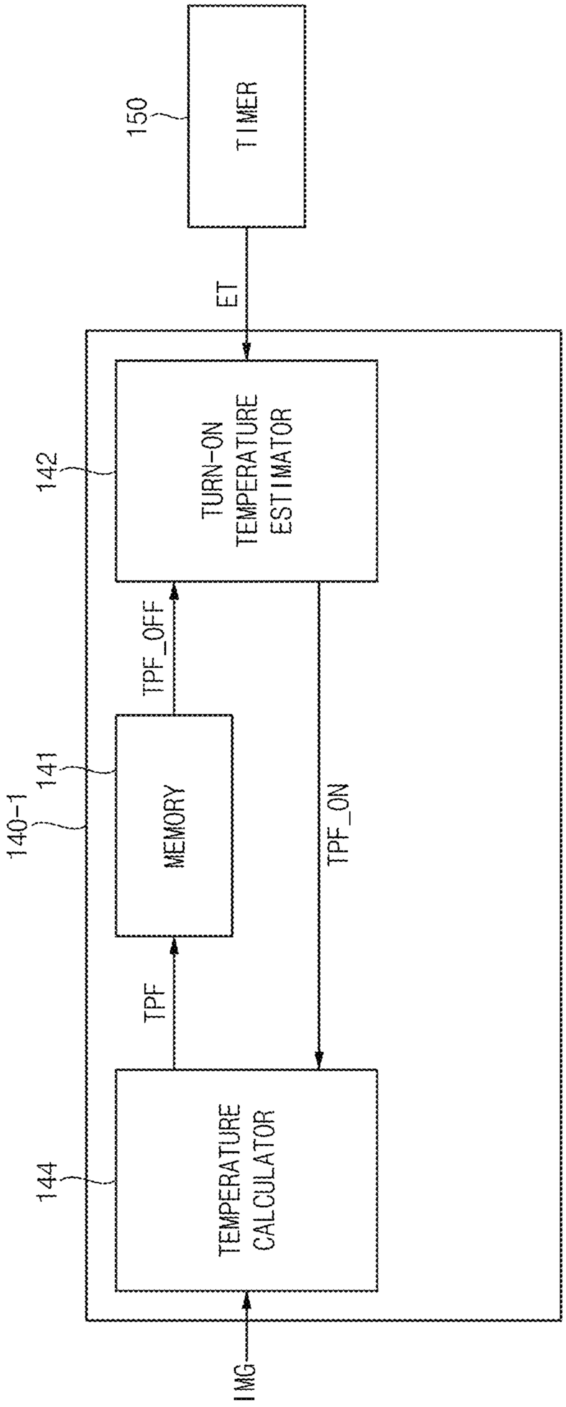
FIG. 8 is a block diagram showing an example of the controller of FIG. 1.

FIG. 8 is a block diagram showing an example of the controller 140-1 of FIG. 1.

Descriptions of components of the controller 140-1 described with reference to FIG. 8, which are substantially the same as or similar to those of the controller 140 described with reference to FIG. 7, may be omitted or simplified.

Referring to FIG. 8, in an embodiment, the controller 140-1 may estimate the turn-on temperature profile TPF_ON using an equation representing the temperature change rate. In this case, the equation may replace a lookup table LUT in which the temperature change rate is stored, and the cost of using the lookup table LUT may be reduced.

In an embodiment, the controller 140-1 may include a memory 141, a turn-on temperature estimator 142, and a temperature calculator 144. The turn-on temperature estimator 142 may estimate the turn-on temperature profile TPF_ON based on the turn-off temperature profile TPF_OFF, the equation representing the temperature change rate TCR, and the elapsed time ET. In an embodiment, the turn-on temperature estimator 142 may be implemented as an integrated circuit, such as a micro controller unit MCU.

Figure 9:
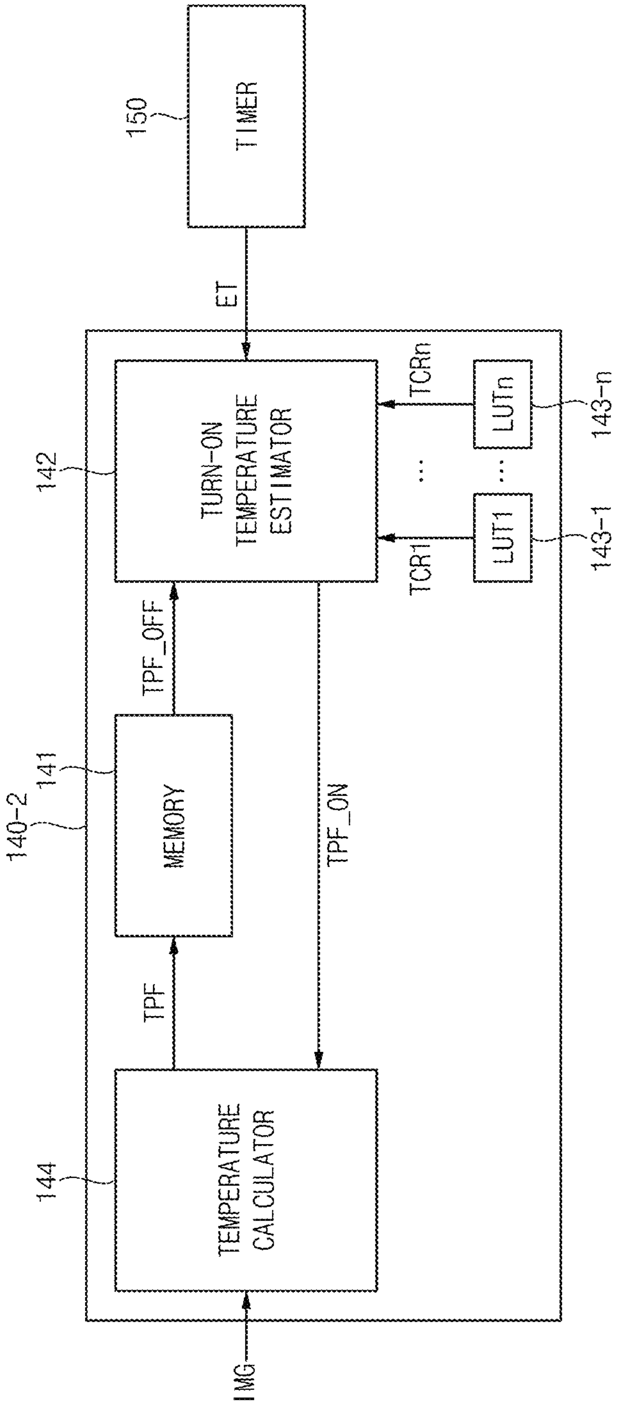
FIG. 9 is a block diagram showing an example of the controller of FIG. 1.

FIG. 9 is a block diagram showing an example of the controller 140-2 of FIG. 1.

Descriptions of components of the controller 140-2 described with reference to FIG. 9, which are substantially the same as or similar to those of the controller 140 described with reference to FIG. 7, may be omitted or simplified.

Referring to FIG. 9, in an embodiment, the controller 140-2 may include a memory 141, a turn-on temperature estimator 142, a plurality of lookup tables 143-1, . . . , **143-*n***

(n is a natural number greater than 1), and a temperature calculator 144. The plurality of lookup tables 143-1, . . . , **143-*n* may store temperature change rates TCR1, . . . , TCRn for a plurality of external temperature ranges. For example, a first lookup table 143-1 may store a temperature change rate TCR1 for a first external temperature range from a first external temperature to a second external temperature greater than the first external temperature, a second lookup table may store a temperature change rate for a second external temperature range from the second external temperature to a third external temperature greater than the second external temperature, and an $n^{th}$ lookup table 143-*n*** may store a temperature change rate TCRn for an $n^{th}$ external temperature range from an $n^{th}$ external temperature greater than the third external temperature to an n+1th external temperature greater than the $n^{th}$ external temperature.

The controller 140-2 may estimate the turn-on temperature profile TPF_ON using a lookup table for an external temperature range that includes an external temperature at the turn-off time of the display device 100 among the plurality of lookup tables 143-1, . . . , **143-*n*. For example, when the external temperature is included in the first external temperature range at the turn-off time of the display device 100, the controller 140-2 may estimate the turn-on temperature profile TPF_ON using the first lookup table 143-1. In this case, the turn-on temperature estimator 142** may estimate the turn-on temperature profile TPF_ON based on the turn-off temperature profile TPF_OFF, the temperature change rate TCR1 for the first external temperature range, and the elapsed time ET.

Figure 10:
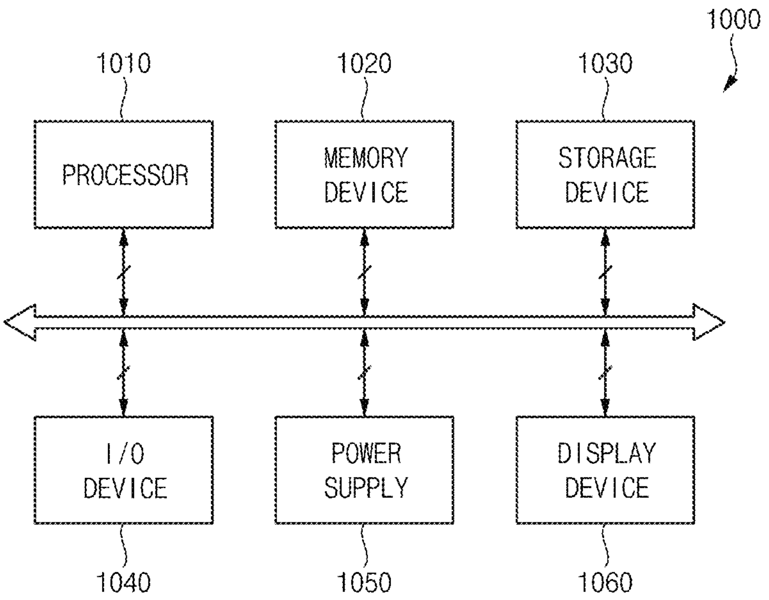
FIG. 10 is a block diagram showing an electronic apparatus according to an embodiment.
Figure 11:
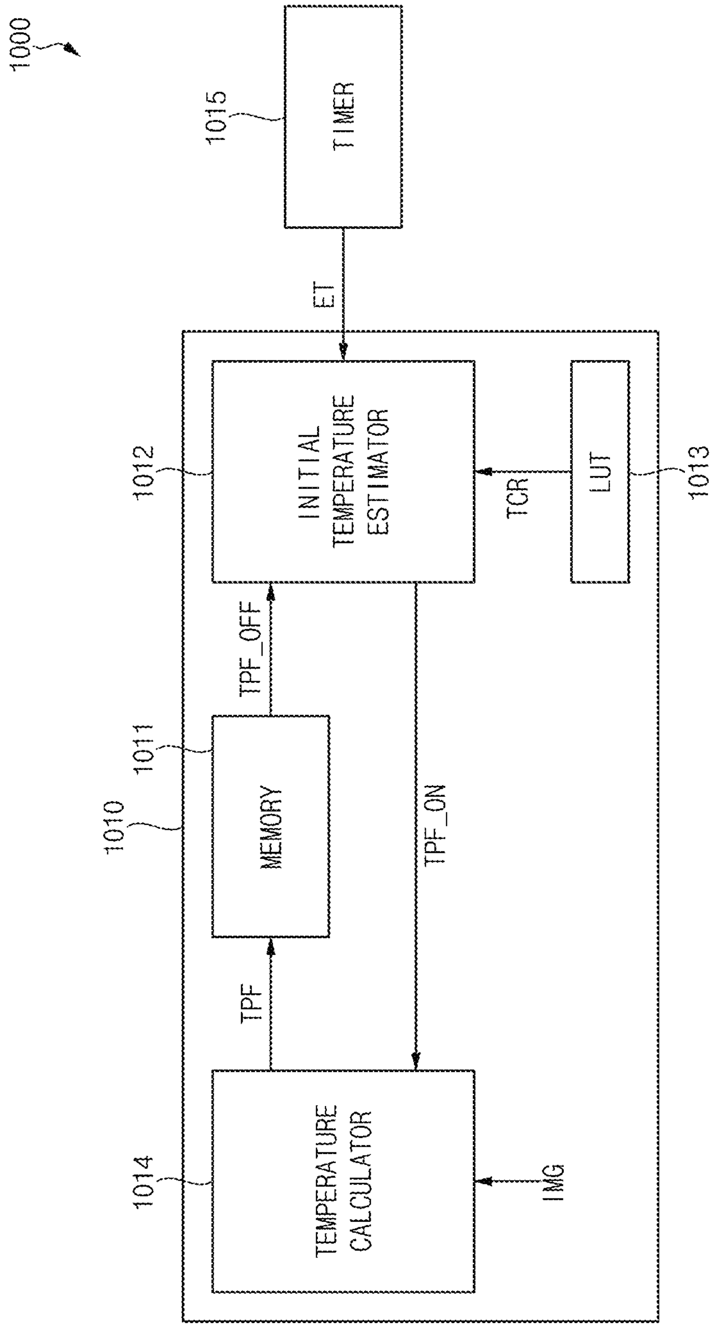
FIG. 11 is a block diagram showing an example of a processor of FIG. 10.

FIG. 10 is a block diagram showing an electronic apparatus 1000 according to an embodiment. FIG. 11 is a block diagram showing an example of a processor 1010 of FIG. 10.

Referring to FIG. 10 and FIG. 11, the electronic apparatus 1000 may include a processor 1010, a memory device 1020, a storage device 1030, an input/output (I/O) device 1040, a power supply 1050, and a display device 1060. The electronic apparatus 1000 may further include a timer 1015. The timer 1015 may be connected to the processor 1010 and may provide an elapsed time to the processor 1010. The electronic apparatus 1000 may further include a plurality of ports capable of communicating with a video card, a sound card, a memory card, a USB device, and the like, or communicating with other systems.

The processor 1010 may perform specific calculations or tasks. In an embodiment, the processor 1010 may be a microprocessor, a central processing unit (CPU), or the like. The processor 1010 may be connected to other components through an address bus, a control bus, a data bus, and the like. In an embodiment, the processor 1010 may also be connected to an expansion bus such as a peripheral component interconnect (PCI) bus. The processor 1010 may provide the image data IMG of FIG. 1 and the control signal CTRL of FIG. 1 to the display device 1060. The processor 1010 may provide other data to the display device 1060.

The processor 1010 may calculate a temperature profile of the display device 1060. The temperature profile may be a two-dimensional temperature profile including temperature values corresponding to a plurality of blocks of the display device 1060.

The processor 1010 may calculate the temperature profile based on a temperature increase profile of the display device 1060 and the turn-on temperature profile at a turn-on time of the display device 100. For example, the processor 1010 may calculate the temperature increase profile based on grayscales of the image data IMG. Specifically, the processor 1010 may calculate data voltages based on the grayscales of the image data IMG, and may calculate the temperature increase profile based on a swing level of the data voltages VDAT. For example, each grayscale value may be associated with a specific voltage level, wherein a low grayscale value may correspond to a low data voltage and low brightness and a high grayscale value may correspond to a high data voltages and a high brightness. The voltage levels may be determined at a turn-on of the display device 1060 and/or dynamically over time to match the characteristics, including the temperature profile, of the display device 1060.

To accurately calculate the temperature profile, the processor 1010 may store a turn-off temperature profile TPF_OFF before a turn-off of the display device 1060, may estimate a turn-on temperature profile TPF_ON at the turn-on time based on the turn-off temperature profile TPF_OFF, a temperature change rate TCR after the turn-off of the display device 1060, and an elapsed time ET from a turn-off time of the display device 1060 to the turn-on time, and may calculate the temperature profile TPF based on the turn-on temperature profile TPF_ON and a temperature increase profile after a turn-on of the display device 1060. As the processor 1010 estimates the turn-on temperature profile TPF_ON at the turn-on time based on the turn-off temperature profile TPF_OFF, the temperature change rate TCR, and the elapsed time ET, the temperature profile TPF of the display device 1060 may be accurately calculated.

In an embodiment, the processor 1010 may periodically store the temperature profile TPF after the turn-on of the display device 1060. In this case, the processor 1010 may use the last stored temperature profile TPF before the turn-off of the display device 1060 as the turn-off temperature profile TPF_OFF.

In an embodiment, the processor 1010 may store the turn-off temperature profile TPF_OFF at the turn-off time of the display device 1060. In this case, the processor 1010 may calculate and store the turn-off temperature profile TPF_OFF after the turn-off of the display device 1060. For example, the processor 1010 may calculate and store the turn-off temperature profile TPF_OFF immediately after the turn-off of the display device 1060. For example, the processor 1010 may calculate and store the turn-off temperature profile TPF_OFF within about 5 seconds of the turn-off of the display device 100, or within about 1 second, or within about 0.25 seconds after the turn-off of the display device 1060. According to an aspect of the present disclosure, the turn-off temperature profile TPF_OFF may be stored during, or before, the turn-off of the display device 100, for example, after a command is received by the controller 140 to turn-off of the display device 100 but before the command is executed, or the turn-off temperature profile TPF_OFF may be periodically stored, wherein a last store of the turn-off temperature profile TPF_OFF before the turn-off of the display device 1060 may be used.

The turn-off temperature profile TPF_OFF may be stored in a non-volatile memory. For example, the turn-off temperature profile TPF_OFF may be stored in a flash memory.

In an embodiment, the processor 1010 may estimate the turn-on temperature profile TPF_ON using a look-up table LUT in which the temperature change rate TCR is stored. The look-up table LUT may be generated by measuring the temperature of the display device 1060 after the turn-off of the display device 1060.

As illustrated in FIG. 11, in an embodiment, the processor 1010 may include a memory 1011, a turn-on temperature estimator 1012, a lookup table 1013, and a temperature calculator 1014. The processor 1010 described with reference to FIG. 11 may be substantially the same as or similar to the controller 140 described with reference to FIG. 7.

In an embodiment, the processor 1010 may include a memory, a turn-on temperature estimator, and a temperature calculator, like the controller 140-1 described with reference to FIG. 8. In an embodiment, the processor 1010 may include a memory, a turn-on temperature estimator, a plurality of lookup tables, and a temperature calculator, like the controller 140-2 described with reference to FIG. 9.

The memory device 1020 may store data for an operation of the electronic apparatus 1000. For example, the memory device 1020 may include: a nonvolatile memory device such as an erasable programmable read-only memory (EPROM), an electrically erasable programmable read-only memory (EEPROM), a flash memory, a phase change random access memory (PRAM), a resistance random access memory (RRAM), a nano floating gate memory (NFGM), a polymer random access memory (PoRAM), a magnetic random access memory (MRAM), or a ferroelectric random access memory (FRAM); and/or a volatile memory device such as a dynamic random access memory (DRAM), a static random access memory (SRAM), or a mobile DRAM.

The storage device 1030 may include a solid state drive (SSD), a hard disk drive (HDD), a CD-ROM, and the like. The I/O device 1040 may include: an input device such as a keyboard, a keypad, a touch pad, a touch screen, or a mouse; and an output device such as a speaker or a printer. The power supply 1050 may supply power for the operation of the electronic apparatus 1000.

The display device 1060 may display an image based on the image data IMG. The display device 1060 may be connected to other components through the buses or other communication links. The display device 1060 may correspond to the display device 100 of FIG. 1. In the electronic apparatus 1000 described with reference to FIGS. 10 and 11, the controller included in the display device 1060 may not store the turn-off temperature profile, may not estimate the turn-on temperature profile, and may not calculate the temperature profile.

Figure 12:
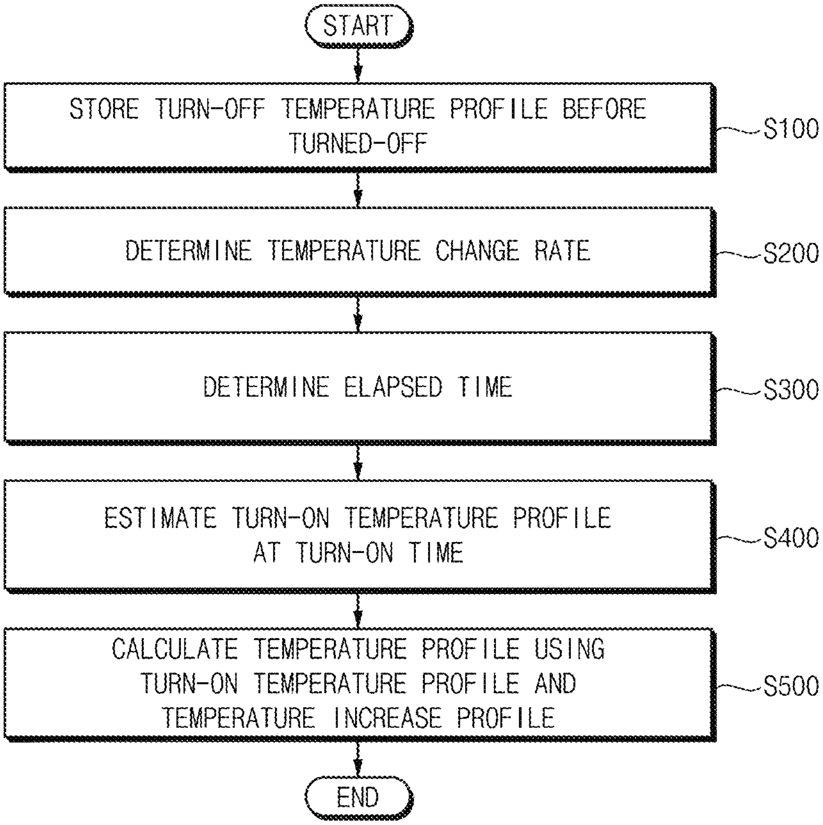
FIG. 12 is a flowchart showing a method of estimating a temperature of a display device according to an embodiment.

FIG. 12 is a flowchart showing a method of estimating a temperature of a display device according to an embodiment.

Referring to FIGS. 1 to 12, in a method of estimating a temperature of a display device, a turn-off temperature profile TPF_OFF of the display device may be stored (S100). The turn-off temperature profile TPF_OFF may be stored before the display device is turned-off. On the turn-off temperature profile TPF_OFF, a temperature change rate TCR after the turn-off of the display device may be determined (S200) and an elapsed time ET from a turn-off time of the display device to the turn-on time may be determined (S300). A turn-on temperature profile TPF_ON at a turn-on time may be estimated based on the turn-off temperature profile TPF_OFF, the temperature change rate TCR after the turn-off of the display device, and the elapsed time ET from a turn-off time of the display device to the turn-on time (S400). A temperature profile TPF may be calculated based on the turn-on temperature profile TPF_ON and a temperature increase profile after a turn-on of the display device (S500).

In an embodiment, when storing the turn-off temperature profile TPF_OFF (S100), the temperature profile TPF may be periodically stored after the turn-on of the display device. In this case, the last stored temperature profile TPF before the turn-off of the display device may be used as the turn-off temperature profile TPF_OFF.

In an embodiment, when storing the turn-off temperature profile TPF_OFF (S100), the turn-off temperature profile TPF_OFF may be stored at the turn-off time of the display device. In this case, the turn-off temperature profile TPF_OFF may be calculated and stored immediately after the turn-off of the display device.

The temperature change rate TCR (S200) may be a ratio of a difference between a temperature of the display device and an external temperature after the turn-off of the display device to a difference between the temperature of the display device and the external temperature at the turn-off time of the display device.

In an embodiment, when estimating the turn-on temperature profile TPF_ON (S400), the turn-on temperature profile TPF_ON may be estimated using a lookup table LUT in which the temperature change rate TCR is stored.

In an embodiment, when estimating the turn-on temperature profile TPF_ON (S400), the turn-on temperature profile TPF_ON may be estimated using an equation representing the temperature change rate TCR.

In an embodiment, when estimating the turn-on temperature profile TPF_ON (S400), the turn-on temperature profile TPF_ON may be estimated using a look-up table for an external temperature range that includes an external temperature at the turn-off time of the display device among a plurality of look-up tables 143-1, . . . , **143-*n*** that store temperature change rates TCR1, . . . , TCRn for a plurality of external temperature ranges.

A method of estimating the temperature of the display device according to embodiments may be applied to a method of estimating a temperature of a display device included in a computer, a notebook, a mobile phone, a smart phone, a smart pad, a smart watch, a PMP, a PDA, an MP3 player, or the like.

Although a display device, an electronic apparatus, and a method of estimating the temperature of the display device according to embodiments have been described with reference to the drawings, embodiments are examples, and may be modified and changed by a person having ordinary knowledge in the relevant technical field without departing from the technical spirit described in the following claims.

What is claimed is:

1. A display device comprising:

a display panel including a plurality of blocks;

a data driver configured to provide data voltages to the display panel; and a controller configured to control the data driver according to a temperature profile, store a turn-off temperature profile of the display device, estimate a turn-on temperature profile at a turn-on time of the display device using the turn-off temperature profile, a temperature change rate after a turn-off of the display device, and an elapsed time from a turn-off time of the display device to the turn-on time, and calculate the temperature profile based on the turn-on temperature profile and a temperature increase profile after a turn-on of the display device.

2. The display device of claim 1, wherein each of the turn-off temperature profile and the turn-on temperature profile includes temperature values corresponding to the plurality of blocks.

3. The display device of claim 1, wherein the controller is configured to periodically store the temperature profile after the turn-on of the display device.

4. The display device of claim 1, wherein the controller is configured to store the turn-off temperature profile at the turn-off time of the display device.

5. The display device of claim 1, further comprising:
a non-volatile memory,
wherein the turn-off temperature profile is stored in the non-volatile memory.

6. The display device of claim 1, wherein the temperature change rate is a ratio of a difference between a temperature of the display device and an external temperature after the turn-off of the display device to a difference between the temperature of the display device and the external temperature at the turn-off time.

7. The display device of claim 1, further comprising:
a timer configured to measure the elapsed time and provide the elapsed time to the controller.

8. The display device of claim 1, wherein the controller is configured to estimate the turn-on temperature profile using a look-up table in which the temperature change rate is stored.

9. The display device of claim 1, wherein the controller is configured to estimate the turn-on temperature profile using an equation which represents the temperature change rate.

10. The display device of claim 1, wherein the controller includes a plurality of look-up table which store the temperature change rate for a plurality of external temperature ranges, and
wherein the controller is configured to estimate the turn-on temperature profile using a look-up table for an external temperature range which includes an external temperature at the turn-off of the display device among the plurality of look-up tables.

11. The display device of claim 1, wherein the temperature increase profile is calculated based on the data voltages.

12. An electronic apparatus comprising:
a display device configured to display an image and comprising:
a display panel including a plurality of blocks;
a data driver configured to provide data voltages to the display panel; and
a controller configured to control the data driver according to a temperature profile, store a turn-off temperature profile of the display device, estimate a turn-on temperature profile at a turn-on time of the display device using the turn-off temperature profile, a temperature change rate after a turn-off of the display device, and an elapsed time from a turn-off time of the display device to the turn-on time, and calculate the temperature profile based on the turn-on temperature profile and a temperature increase profile after a turn-on of the display device; and
a processor configured to provide image data to the display device, wherein the display device converts the image data into the data voltages.

13. The electronic apparatus of claim 12, wherein each of the turn-off temperature profile and the turn-on temperature profile includes temperature values corresponding to the plurality of blocks of the display device.

14. The electronic apparatus of claim 12, wherein the controller is configured to periodically store the temperature profile after the turn-on of the display device.

15. The electronic apparatus of claim 12, wherein the display device further comprises:
a non-volatile memory,
wherein the turn-off temperature profile is stored in the non-volatile memory.

16. The electronic apparatus of claim 12, wherein the temperature change rate is a ratio of a difference between a temperature of the display device and an external temperature after the turn-off of the display device to a difference between the temperature of the display device and the external temperature at the turn-off time.

17. The electronic apparatus of claim 12, wherein the controller is configured to estimate the turn-on temperature profile using a look-up table in which the temperature change rate is stored.

18. The electronic apparatus of claim 12, wherein the controller is configured to calculate the temperature increase profile using grayscales of the image data.

19. A method of estimating a temperature of a display device, the method comprising:
storing a turn-off temperature profile of the display device;
estimating a turn-on temperature profile at a turn-on time of the display device using the turn-off temperature profile, a temperature change rate after a turn-off of the display device, and an elapsed time from a turn-off time of the display device to the turn-on time; and
calculating a temperature profile based on the turn-on temperature profile and a temperature increase profile after a turn-on of the display device.

20. The method of claim 19, further comprising calculating the temperature change rate as a ratio of a difference between a temperature of the display device and an external temperature after the turn-off of the display device to a difference between the temperature of the display device and the external temperature at the turn-off time.

* * * * *